United States Patent
Chen et al.

(10) Patent No.: US 7,107,613 B1
(45) Date of Patent: Sep. 12, 2006

(54) METHOD AND APPARATUS FOR REDUCING THE NUMBER OF TUNNELS USED TO IMPLEMENT A SECURITY POLICY ON A NETWORK

(75) Inventors: Shigang Chen, Santa Clara, CA (US); Partha Bhattacharya, Cupertino, CA (US); Susan Hinrichs, Savoy, IL (US)

(73) Assignee: Cisco Technology, Inc., San Jose, CA (US)

( * ) Notice: Subject to any disclaimer, the term of this patent is extended or adjusted under 35 U.S.C. 154(b) by 926 days.

(21) Appl. No.: 10/109,387

(22) Filed: Mar. 27, 2002

(51) Int. Cl.
*G06F 17/00* (2006.01)
*G06F 15/173* (2006.01)

(52) U.S. Cl. .......................... 726/14; 709/241; 726/13
(58) Field of Classification Search ................ 726/14, 726/15, 13; 709/241
See application file for complete search history.

(56) References Cited

U.S. PATENT DOCUMENTS

| | | | |
|---|---|---|---|
| 6,438,612 B1 * | 8/2002 | Ylonen et al. | 709/249 |
| 6,738,909 B1 * | 5/2004 | Cheng et al. | 726/3 |
| 2002/0178361 A1 * | 11/2002 | Genty et al. | 713/175 |
| 2003/0135753 A1 * | 7/2003 | Batra et al. | 713/201 |
| 2003/0140142 A1 * | 7/2003 | Marples et al. | 709/225 |

OTHER PUBLICATIONS

Ioannidis et al., "Implementing a Distributed Firewall", 2000, ACM 1-58113-203-4/00/0011, pp. 190-199.*
Guttman, "Filtering Postures: Local Enforcement for Global Policies", 1997, IEEE, pp. 120-129.*
Ioannidis et al., "Implementing a Distributed Firewall", 2000, ACM, pp. 190-199.*

* cited by examiner

*Primary Examiner*—Matthew Smithers
(74) *Attorney, Agent, or Firm*—Hickman Palermo Truong & Becker LLP

(57) ABSTRACT

According to one embodiment, the number of tunnels on a network may be reduced. A set of tunnels are selected which exchange data packets between a first security device and a second security device. Each tunnel in the set of tunnels specify a dimensional range for data packets that are subject to that tunnel. A super tunnel is determined to replace the set of tunnels, so that a dimensional range of the data packets that are made subject to the super tunnel encompass a dimensional range of the data packets that were made subject to the set of tunnels. A determination is made as to whether the super tunnel excludes data packets that are permitted by the first security device and the second security device, but not subject to any one of the tunnels other than tunnels in the set of tunnels. In response to determining that the tunnel excludes data packets that are permitted by the first security device and the second security device, but not subject to any one of the tunnels in the set of tunnels, the super tunnel is implemented between the first security device and the second security device.

34 Claims, 6 Drawing Sheets

METHOD AND APPARATUS FOR REDUCING THE NUMBER OF TUNNELS USED TO IMPLEMENT A SECURITY POLICY ON A NETWORK

FIELD OF THE INVENTION

The present invention generally relates to configuring security policies on a network. The invention relates more specifically to a method and apparatus for reducing the number of tunnels used to implement a security policy on a network.

BACKGROUND OF THE INVENTION

Network security management is a field of increasing complexity. The use of tunnels to service and transport data packets is common on managed networks. In particular, IP Security Protocol (IPSEC) tunneling is used as a primary component to implement a security policy. For example, IPSEC tunnels are used to build secure virtual private networks (VPNs). IPSEC tunnels are widely deployed in large network environments that employ numerous IPSEC enabled security devices and VPNs.

The number of tunnels that an IPSEC enabled device can support may vary. Currently, high-end firewalls support over a thousand IPSEC tunnels, while low-end firewalls support only a few. But in each case, the number of IPSEC tunnels that can be supported by a particular device is finite. Among other limitations, this constraint limits the scalability of VPN deployment. For example, a large enterprise network with a major corporate site might include hundreds of remote sites around the world, as well as hundreds of business partner sites. If the corporate site wants to establish a VPN connection with each of the remote sites or partner sites, its firewall (called hub) needs to support many (sometimes hundreds) simultaneous IPSEC tunnels. In addition, as the granularity of VPN configuration becomes finer, more than one tunnel is needed for each site. As a result, the hub may be required to support thousands of tunnels. Due to the limited ability to expand IPSEC tunneling, use of tunneling in this type of corporate network can impose performance problem and limit future network expansion. Additional network expansion can become expensive as limits are reached on the amount of tunneling that can be carried on the security devices of the network. Even at a remote office, the number of IPSEC tunnels needed to connect to the corporate site may exceed the network's IPSEC capacity if a low-end firewall is used.

There are some important practical values in minimizing the number of tunnels used in a security configuration. For example, networks can scale more easily when fewer tunnels exist to implement a security policy. In general, firewalls and other security devices are easier to implement and manage on a network having a smaller number of tunnels. In addition, the use of a smaller number of tunnels can also facilitate the filtering of data packets through security measures and tunnels Currently, networks build tunnels and other security measures onto one another. Removing unnecessary tunnels is usually performed manually by administrators of a network.

The approaches described in this section could be pursued, but are not necessarily approaches that have been previously conceived or pursued. Therefore, unless otherwise indicated herein, the approaches described in this section are not prior art to the claims in this application and are not admitted to be prior art by inclusion in this section.

SUMMARY OF THE INVENTION

The foregoing needs, and other needs and objects that will become apparent for the following description, are achieved in the present invention, which comprises, in one aspect, a method for reducing the number of tunnels used to implement a security policy on a network.

According to an embodiment of the invention, the number of tunnels used to implement a security policy on a network may be programmatically reduced. The programmatic reduction of tunnels on the network may be achieved by determining and implementing a super tunnel in place of existing tunnels on the network. Prior to implementing the super tunnel, a determination may be made as to whether the super tunnel would tunnel or otherwise modify data packets that should be designated for other tunnels or as clear data traffic.

In one embodiment, a set of tunnels are selected which exchange data packets between a first security device and a second security device. Each tunnel in the set of tunnels specify a dimensional range for data packets that are subject to that tunnel. A super tunnel is determined to replace the set of tunnels, so that a dimensional range of the data packets that are made subject to the super tunnel encompass dimensional ranges of the data packets that were made subject to the set of tunnels. A determination is made as to whether the super tunnel would, if implemented, tunnel data packets that are otherwise subject only to tunnels in the set of tunnels. In response to determining that the tunnel excludes data packets that are permitted by the first security device and the second security device, but not subject to any one of the tunnels in the set of tunnels, the super tunnel is implemented between the first security device and the second security device.

In other aspects, the invention encompasses a computer apparatus, a computer readable medium, and a carrier wave configured to carry out the foregoing steps.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION OF THE PREFERRED EMBODIMENT

Figure 1:
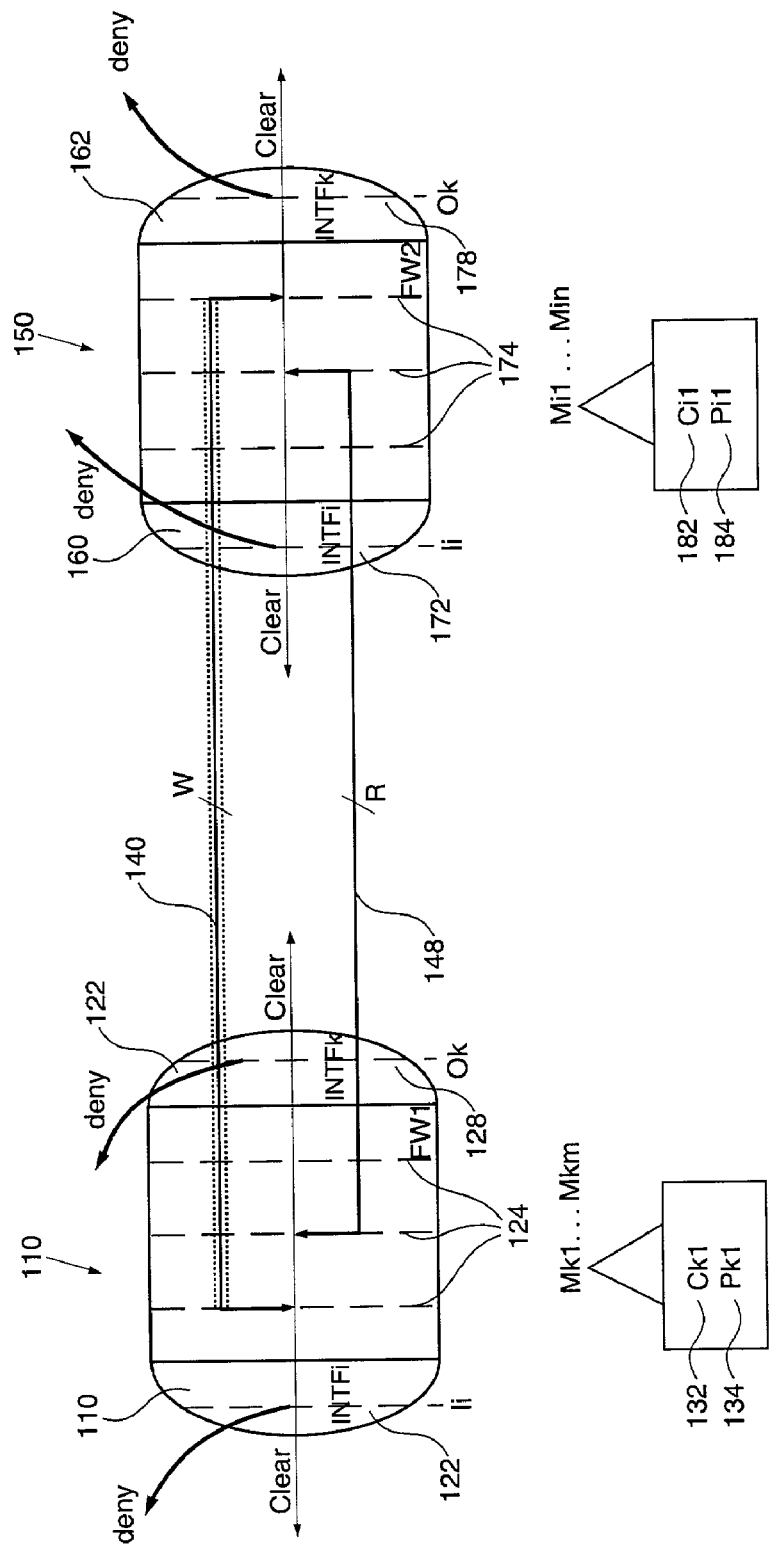
FIG. 1 is a simplified illustration of a super tunnel implemented between security devices on a network.

A method and apparatus for reducing the number of tunnels used to implement a security policy. In the following description, for the purposes of explanation, numerous specific details are set forth in order to provide a thorough understanding of the present invention. It will be apparent, however, to one skilled in the art that the present invention may be practiced without these specific details. In other instances, well-known structures and devices are shown in block diagram form in order to avoid unnecessarily obscuring the present invention.

Embodiments are described herein according to the following outline:

| | |
|---|---|
| 1.0 | OVERVIEW |
| 2.0 | SYSTEM DESCRIPTION |
| 3.0 | METHODOLOGY FOR IMPLEMENTING SUPER TUNNELS |
| 4.0 | IMPLEMENTATION ARCHITECTURE |
| 5.0 | HARDWARE DESCRIPTION |
| 6.0 | EXTENSIONS AND ALTERNATIVES |

1.0 Overview

Embodiments of the invention enable the reduction of tunnels used to implement a security policy on a network. The reduction may be implemented programmatically, such as through a routine that is automatically executed. The result is that the number of tunnels employed on a network as part of a security policy is reduced. By reducing the number of tunnels, the network is made more efficient, manageable and scalable. In particular, tunneling resources of security devices that would otherwise have limited ability to expand tunneling are conserved.

In one embodiment, a set of tunnels that exchange data packets between a first security device and a second security device are selected. Each of the tunnels specify a dimensional range for data packets that are subject to that tunnel. A super tunnel is determined from the set of tunnels, so that a dimensional range of the data packets that would be made subject to the super tunnel encompasses dimensional ranges of the data packets that are subject to the set of tunnels. A determination is made as to whether the super tunnel would, if implemented, tunnel data packets that are otherwise subject only to tunnels in the set of tunnels. In response to making the determination, the super tunnel is implemented between the first security device and the second security device.

A "security device" is any device that can regulate traffic on a network, including denying or permitting packets of data. A security device may also include any device that will permit data packets to proceed to a destination under certain conditions. Security devices may include firewalls.

As used herein, the term "tunnel" refers to a network mechanism by which a data packet is transported from one security device to another security device, and made to undergo a treatment in preparation for or while undergoing the transport.

A "super tunnel" is a tunnel that is calculated to encompass two or more tunnels.

The terms "treatment" or "action" performed by a tunnel or super tunnel refers to modifications or alterations made to a data packet in conjunction with transporting the data packet. The modifications or alterations include, for example, execution of processes that encrypt, authenticate, and verify the data packet.

2.0 System Description

FIG. 1 is a simplified illustration of a super tunnel implemented between security devices on a network. FIG. 1 illustrates a first firewall (FW1) 110 and a second firewall (FW2) 150 that form part of a network's security system. One or more security policies may be implemented on the security system by configuring individual firewalls, such as first firewall 110 and second firewall 150, with instructions for performing specific actions on identified data packets. Each firewall 110, 150 may include one or more interfaces to portions of network 100. In an example shown by FIG. 1, first firewall 110 includes first interface 120 (INTFi) and a second interface 122 (INTFk). The second firewall 150 includes a first interface 160 (INTFi) and a second interface 162 (INTFk).

Among some of the actions and treatment that may be performed as part of a network's security policy, select data packets may be tunneled between interfaces of different firewalls. For example, several tunnels may exist between first firewall 110 and second firewall 150. Each tunnel may encrypt and/or authenticate data packets of a specified dimensional range, and forward the data packets from one of the first or second firewall 110, 150 to the other of the first or second firewall. According to embodiments described herein, the number of tunnels that may exist between firewall interfaces on the network may be reduced by implementing a super tunnel to replace a set of existing tunnels.

In FIG. 1, first interfaces 120, 160 on each firewall 110, 150 may correspond to an inlet interface that regulates data packets sent to that firewall from a corresponding portion of the network. The first interfaces 120, 160 of the firewalls 110, 150 maybe configured with entries for implementing a portion of a security policy on that firewall. Each of those entries may instruct the first interfaces 120, 160 on how to treat data packet having a particular dimension. A dimension of a data packet may refer to any one of a source address, destination address, source port, destination port, or network protocol in which the data packet is being sent. The first interfaces 120, 160 will identify the dimensions of data packets in order to determine whether those data packets are permitted by first and second firewalls 110, 150. The first interfaces 120, 160 may also perform some action or treatment on the data packet based on the data packet's dimensions.

The second interfaces 122, 162 may correspond to outlet interfaces on the respective first firewall 120 and second firewall 160. Each of the second interfaces 122, 162 may also regulate data packets that are sent out from the respective first firewall 120 and second firewall 160. Each of the second interfaces 122, 162 may also be configured with entries for implementing another portion of the security policy. As inlet and outlet interfaces on each firewall 110, 150, both the first interfaces 120, 160 and the second interfaces 122, 162 may cause traffic passing through their respective firewalls to be denied (or permitted). The definition of the above inlet and outlet interfaces assume a traffic direction from 120 to 122 to 160 and then to 162. For the reverse traffic direction, the inlet interfaces will be 122 and 162 for respective first firewall 110 and second firewall 150, and the outlet interfaces will be 120 and 160, respectively.

In an embodiment, each firewall on the network may be configured by a combination of access control lists (ACLs) and crypto-access control lists (CACLs). The first firewall 110 may be configured by an inlet ACL 122 (Ii) associated with the first interface 122, and a set of crypto-maps 124 (Mk1 ... Mkm) and an outlet ACL 128 (Ok) associated with the second interface 122. The inlet ACL 122 and outlet ACL 128 each include one or more entries entered by a user or administrator of the network. The individual entries of inlet ACL 122 and outlet ACL 128 specify whether data packets of a particular dimension or dimensional range are to be permitted or denied by first firewall 110. Therefore, only some of the data packets sent to first firewall 110 may be permit traffic, and data packets not identified as permit traffic are denied.

The second firewall 150 may be configured similarly to first firewall 110. The first interface 160 of second firewall 150 may be configured by an inlet ACL 172 (Ii) and an outlet ACL 178 (Ok), each having entries specified by the user or administrator. The second firewall 150 may also be configured by a set of crypto-maps 174 (Mi1 . . . Min) associated with interface 160. The individual entries of the inlet ACL 172 and the outlet ACL 178 of the second firewall 150 may also be configured to identify some of the data packets sent to the second firewall as permit traffic, while other data packets are dropped because they are identified as deny traffic.

Each of the first crypto-maps 124 includes one CACL 132. Likewise, each of the second crypto-maps 174 also includes one crypto-access control list (CACL) 182. Each CACL 132, 182 includes a plurality of entries, where each entry specifies a tunnel service for a data packet of a particular dimension or dimensional range. The data packets specified by the entries of the CACLs 132, 182 are part of the permit traffic for the firewall 110, 150 associated with that CACL. The tunnel service causes data packets received by one firewall to be sent to another firewall in a secure channel.

With the first firewall 110, the CACL 132 of each crypto-map 124 includes a reference 134 to a peer of that CACL. As will be explained, the peer of each CACL 132 corresponds to a CACL on the interface of another security device on the network. In an example provided by FIG. 1, the peer of one of the CACLs 132 (i.e. Ck1) may corresponds to one of the CACLs 182 (i.e. Ci1) of the second firewall 150.

Likewise, the CACL 182 of each crypto-map 174 in the second firewall 160 includes a reference 184 to a peer of that CACL on the interface of another security device. For example, the reference 184 may correspond to CACL 132 on first firewall 110.

In each of the first firewall 110 and second firewall 150, data packets that enter the respective firewall are permitted by the respective inlet ACLs 122, 172 and outlet ACLs 128, 178 of that firewall. Each of the inlet ACLs 122, 172 and outlet ACLs 128, 178 specify dimensional ranges for data packets that are to be permitted. The permit data packets may either be designated as clear traffic, or subject to a tunnel defined by an entry in one of the CACLs 124, 174 for that firewall. Individual entries of each CACL 132, 182 may specify a tunnel for data packets having a particular dimensional range. For example, if CACL 132 on first firewall 110 is assumed to have its peer as CACL 182 on second firewall 150, then each entry in the CACLs 132, 182 is said to form a tunnel between the first firewall 110 and the second firewall 150.

Specific types of tunnels considered by embodiments of the invention include IPSEC tunnels. Specific actions that may occur to a tunneled data packet include encryption and authentication of the data packet, as well as delivery of the data packet from one firewall interface to another firewall interface. As part of the tunnel service, the payload of a data packet may be encrypted, and the header of the data packet may be transformed to include new source and destination addresses that identify the end nodes of the tunnel.

As mentioned, not all permitted data packets that are processed by either the first interfaces 120, 160 or the second interfaces 122, 162 are subject to a tunnel defined by CACL entries of the crypto-maps in the respective firewalls 110, 150. Data packets that are permitted to pass through the first interface 120, but are not subjected to a tunnel service, are referred to as "clear traffic."

In many applications of firewalls on networks, numerous tunnels may be formed between two security devices. As shown by FIG. 1, prior to implementation of a super tunnel, a first set of tunnels 140, having W number of tunnels, may exist between a CACL of one of the first crypto-maps 124 and a CACL of one of the second crypto-maps 174. Each of the tunnels in the first set of tunnels 140 may be formed as a result of an entry in the CACL of the first crypto-map and an entry of a peer CACL located in the second crypto-map 174. A second set of tunnels 148, having an R number of tunnels, may exist between another CACL of one of the first crypto-maps 124 and another CACL of one of the second crypto-maps 174. Each of the tunnels in the second set of tunnels 148 may be formed as a result of an entry in the other CACL associated with the first crypto-map 124 and an entry of the peer to that other CACL associated with the second firewall 150.

Embodiments of the invention enable a super tunnel to replace a set of tunnels that transport data packets between a pair of firewalls. As shown by FIG. 1, a super tunnel 145 may replace the first set of tunnels 140 if certain criteria are met for implementing the super tunnel on both firewalls. Among other advantages, super tunnel 145 is easier to administer and manage than the first set of tunnels 140. Only one entry in each of the CACLs 132, 182 may be used to define super tunnel 145, while multiple entries are needed in each CACL 132, 182 for each tunnel in the first set of tunnels 140. Furthermore, first security device 110 and second security device 120 may physically be able to carry only a limited number if tunnels, making conservation of the number of tunnels in use on a network valuable.

Accordingly, embodiments of the invention combine tunnels into super tunnel 145 by determining whether a select plurality of entries in one CACL of a particular firewall can be replaced by one semantically equivalent entry. If criteria for implementing a super tunnel is met, the super tunnel may be implemented to replace a group of tunnels between two firewalls on the network. The criteria for implementing the super tunnel 145 is that when implemented, (i) the super tunnel cannot interfere with clear traffic on either of the firewalls 110, 150 forming the end nodes of the super tunnel, and (ii) the super tunnel cannot interfere with data packets that are to undergo tunnel services by tunnels other than those being selected for replacement by the super tunnel on either of the firewalls.

Embodiments of the invention assume that CACL entries that are candidates for a super tunnel specify the same tunnel action (i.e. encryption method, authentication). For example, the crypto-map of the CACL entries may specify one action for all of the entries in its CACL.

According to one embodiment, sets of IPSEC tunnels are replaced between firewalls with one or more super tunnels 145. The result is that fewer IPSEC tunnels need to be managed on a particular network in conjunction with a security policy.

Figure 2A:
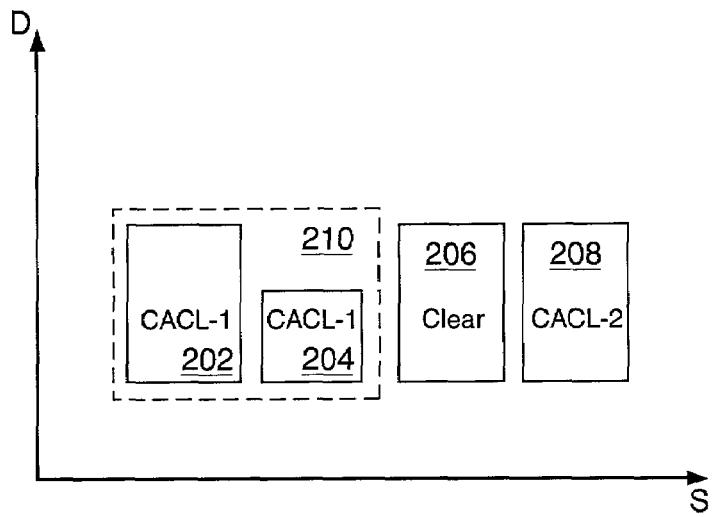
FIG. 2A illustrates when two or more entries of a crypto-access control list may permissibly be replaced with a single entry for a super tunnel.
Figure 2B:
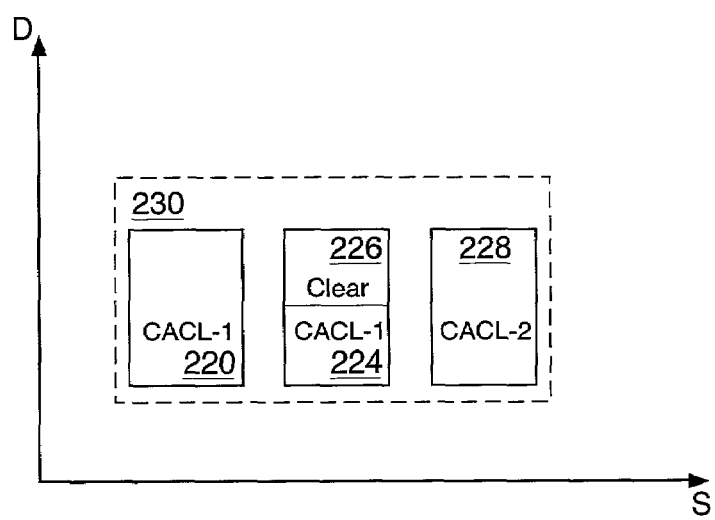
FIG. 2B illustrates a scenario where a super tunnel may not be implemented to replace tunnels between two firewalls because the super tunnel would interfere with clear traffic.
Figure 2C:
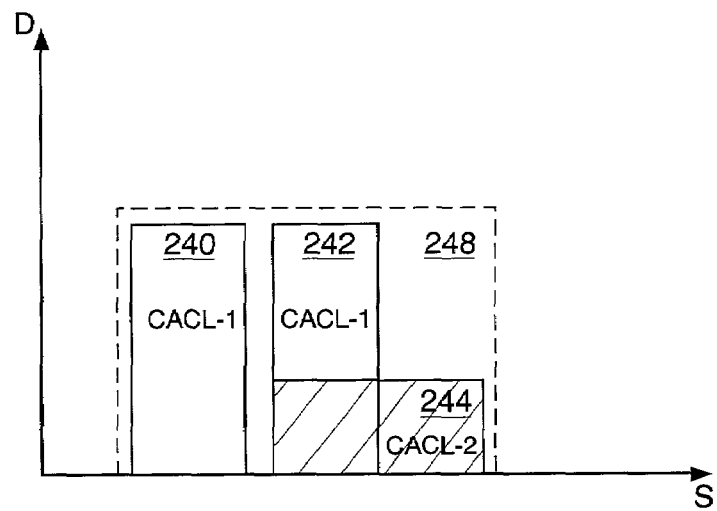
FIG. 2C illustrates a scenario where a super tunnel may not be implemented between two tunnels because the super tunnel would interfere with traffic designated for a third tunnel that is not supposed to be replaced by the super tunnel.

FIGS. 2A–2C illustrate when super tunnels may be implemented between firewalls on a network through consideration of the dimensional ranges of data packets. For purpose of explanation, only the destination and source address ranges of data packets will be considered as dimensional ranges that may vary amongst data packets. Each of the solid-line rectangles illustrated in FIGS. 2A–2C is for an address range of data packets specified by an entry of an ACL or CACL. Broken line rectangles represents a proposed super tunnel. In FIGS. 2A–2C, the same tunnel actions (e.g. encryption and/or authentication) are assumed to be performed on data packets specified by the entries in a particular CACL. Data packets described in FIGS. 2A–2C may be processed and treated on interfaces such as shown by FIG. 1.

FIG. 2A illustrates when two or more entries of a CACL may permissibly be replaced with a single entry. In other words, FIG. 2A illustrates when tunnels created by entries of a CACL may be replaced by a super tunnel defined by the single entry. In FIG. 2A, a first region 202 may correspond to an address range for data packets that are sent through a tunnel specified by a first entry of a first CACL (CACL-1). The second region 204 may correspond to an address range for data packets that are sent through a tunnel specified by a second entry of the first CACL (CACL-1). A third region 206 may represent the address ranges for data packets that pass through the firewall as clear traffic. These data packets may be permitted traffic that are not subject to tunneling by entries of any CACL in the firewall. A fourth region 208 refers to another address range of data packets specified by an entry of a second CACL (CACL-2) associated with that firewall.

In order to implement a super tunnel, the entry defining the super tunnel must be semantically equivalent to a select set of entries in one CACL. Determining a semantically equivalent entry to employ for a super tunnel is described in FIG. 4.

In an embodiment, select entries in one CACL may be replaced by a single entry that defines a super tunnel if implementation of the super tunnel is permissible. The entry of the super tunnel is permissible if the dimensional range specified by the entry of the super tunnel does not include dimensional ranges which are designated to permit clear traffic, or dimensional ranges that are designated to be part of tunnels other than the tunnels being replaced by the super tunnel.

FIG. 2A shows an example where a super tunnel may be formed to replace the tunnel corresponding to regions 202 and regions 204. The super tunnel may be formed because a dimensional range of the super tunnel would cover permit traffic specified by the entries corresponding to regions 202 and 204, but not regions 206 and 208, which correspond to dimensional ranges of clear traffic and traffic of tunnels not selected for the super tunnel.

The single entry of the super tunnel may encompass dimensional ranges of deny traffic, but this is of no consequence because deny traffic is non-existent for the tunnel implemented in the firewall. For example, as described in FIG. 1, the role of inlet ACL (i.e. 122) on a firewall is to determine whether a data packet is part of the permit or deny traffic. Data packets that are deny traffic are not sent through the firewall associated with that inlet ACL. Therefore, the fact that the dimensional range of the super tunnel covers deny traffic has no impact on how permitted data packets are treated by tunnels or super tunnels.

In general, the implementation of a super tunnel corresponds to broadening out dimensional ranges of existing tunnels until the tunnels are combined into one. The dotted region 210 illustrates one possible dimensional range of data packets specified by the single entry on one of the firewalls that defines the super tunnel. The dimensional range of any super tunnel needs to be determined so as to satisfy the criteria for permissible super tunnels. It is best to minimize the size of the super tunnel in order to reduce the chance that the super tunnel would include clear traffic, or traffic destined for other tunnels. The region 210 illustrates dimensional ranges of a permissible super tunnel because region 206 covering dimensional ranges of clear traffic through that interface falls outside of the region 210. The region 208 representing traffic regulated by CACL entries other than those being replaced by the super tunnel also fall outside of the dimensional range of the region 210 representing the super tunnel. Thus, the implementation of a single entry encompassing the select entries represented by regions 202 and 204 is not in conflict with other permit traffic passing through the interface.

FIG. 2B illustrates a scenario where a super tunnel may not be implemented to replace tunnels between two firewalls because the super tunnel would interfere with clear traffic. In FIG. 2B, region 220 represents a dimensional range of a tunnel defined by an entry of a first CACL (CACL-1). The region 224 represents a dimensional range of a tunnel defined by a second entry of the first CACL. The region 226 represents a dimensional range of a tunnel defined by a third entry of the first CACL. The region 228 represents a dimensional range designated for clear traffic. As shown by the box diagram, a region 230 corresponding to a proposed super tunnel for the first, second and third entries would fail because the super tunnel would also regulate data packets that are designated to be clear traffic.

FIG. 2C illustrates a scenario where a super tunnel may not be implemented between two tunnels because the super tunnel would interfere with traffic designated for a tunnel that is not supposed to be replaced by the super tunnel. In FIG. 2C, regions 240 and 242 represent address ranges specified by entries of a first CACL (CACL-1) in a firewall. The third region 244 illustrates an address range specified by an entry of a second CACL (CACL-2) in the same firewall. The super tunnel proposed by region 248 cannot be implemented because it would regulate traffic designated by the entry of the second CACL.

While embodiments described above illustrate formulating super tunnels by broadening out or combining existing tunnels, other embodiments contemplate more sophisticated methodologies for determining super tunnels. For example, in FIGS. 2A, region 210 corresponding to the super tunnel is a rectangle, meaning one entry can be determined for a specified dimensional range that is large enough to encompass the dimensional ranges of the other tunnels being combined. It is possible for a super tunnel to specify discrete address ranges that would encompass multiple address ranges. For example, regions 220, 224 and 228 may be combined by an entry that specifies a dimensional range that includes region 226.

3.0 Methodology for Implementing Super Tunnels

Figure 3:
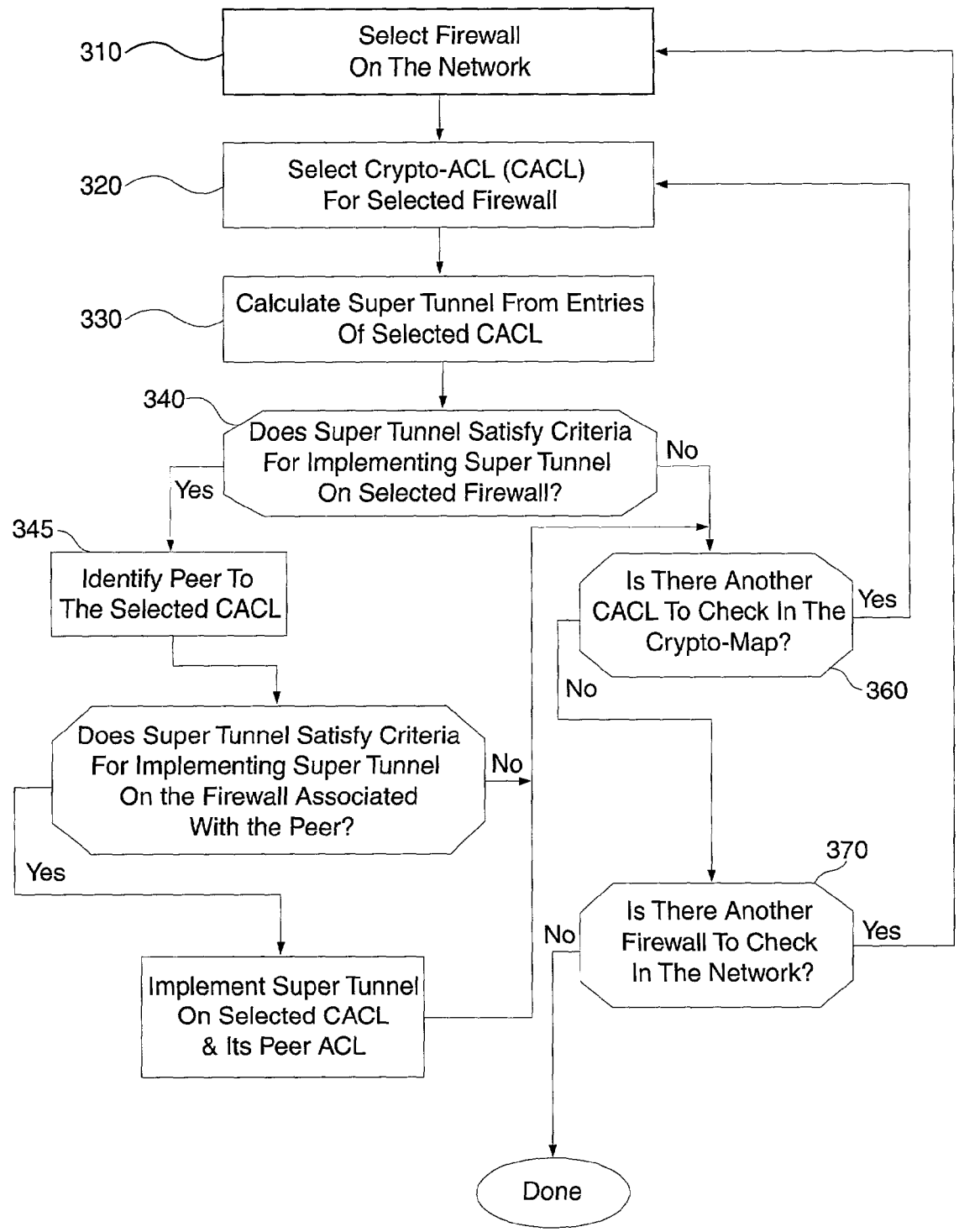
FIG. 3 illustrates a method for implementing a super tunnel on a network for a selected set of firewall interfaces.

FIG. 3 illustrates a method for implementing a super tunnel on a network for a selected set of firewalls. The method may be implemented on a network such as shown by FIG. 1. the method may be used to implement a super tunnel to replace a set of tunnels between a pair of firewalls or other security devices. Reference to elements of FIG. 1 is intended to illustrate exemplary elements for an embodiment of the invention.

In step 310, a firewall is selected on the network being inspected. The selection may be random or part of a systematic routine designed to optimize the configurations of firewalls used to implement a security policy on a network.

In step 320, a CACL is selected that is associated with the selected firewall. The CACL may be part of a crypto-map specifying one or more actions for its CACL entries. As with step 310, this selection may be made as part of a routine designed to optimize the configurations of a particular interface.

According to one embodiment, super tunnels are formulated and implemented to replace all of the tunnels created by the one selected CACL. Accordingly, step 330 provides that a super tunnel is calculated from all of the entries of that CACL. According to one embodiment, calculating the super tunnel includes determining a "super rule" corresponding to one CACL entry that can substitute for all of the entries in the selected CACL. It may be advantageous to minimize the super rule so that the super tunnel is the minimum size needed to encompass all of the tunnels in the selected CACL.

As with any other CACL entry, the super rule specifies a dimensional range for a set of data packets. Given a set of P permit rules in the selected CACL, a minimum super rule R of P is a permit rule in which (i) the source of R is the minimum super network of the sources in P, (ii) the destination of R is the minimum super network of the destinations in P, and (iii) the service of R is the minimum super service of the services in P.

The service of any CACL entry may be characterized by the source port and/or destination port ranges of that entry, together with the protocol used. As such, the super service may be characterized by port ranges that cover all source and destination ports of the CACL entries that may be replaced by the super tunnel. Therefore, the super tunnel may be identified from a super rule by determining dimensional ranges (i.e. destination ranges, source ranges, destination port numbers, source port numbers) that cover the dimensional ranges of all entries intended for substitution by the super rule.

The minimum super network of sources or destinations may be determined as follows. Given a set N of network addresses, a super network of N is a network address that contains all addresses in N. A minimum super network X of N is a super network of N having no sub-networks that can be considered a super network of N. In other words, X completely contains N but any proper sub-network of X cannot completely contain N. For a given set of network addresses, the longest common prefix of all network addresses in the set may be used to determine the minimum super network. The minimum super network is the prefix followed by zeros, with an appropriate network mask.

The following example illustrates determination of a minimum super tunnel between two networks:

Network 1:  10101010.11111111.00000001.00000000 255.255.255.0
Network 2:  10101010.11111110.00000010.00000000 255.255.0.0

The minimum super network for Network 1 and Network 2 includes a fixed prefix portion of the address that the networks have in common with one another: 10101010.1111111. The minimum super network follows this prefix portion with zeros, so that the minimum super network may be expressed as follows:

Min. Super Net.:
    10101010.111111110.00000000.00000000
    255.254.0.0

Given a set S of services, a super service of S completely covers S. A service may be represented or characterized by destination and/or source port numbers. When represented by port numbers, the port range of a super service should contain all port numbers in S. The minimum super service Y of S is a super service of S, but any proper sub-service of Y is not a super service of S. For example, the control port for file transfer protocol (FTP) is 21, and the port for hypertext transfer protocol (HTTP) is 80. However, for many firewalls, a service may be only all IP (Internet Protocol), all TCP (Transmission Control Protocol), all UDP (User Datagram Protocol), TCP with one port, or UDP with one port. In this scenario, the minimum super service of FTP and HTTP is all TCP. The minimum super service of all TCP and all UPD is all IP.

The identified super rule defines the super tunnel for the entries of the selected CACL. According to an embodiment such as shown by FIG. 3, whether the super tunnel can be implemented on the network to replace the tunnels created by the entries of the selected CACL is not yet known.

Figure 4:
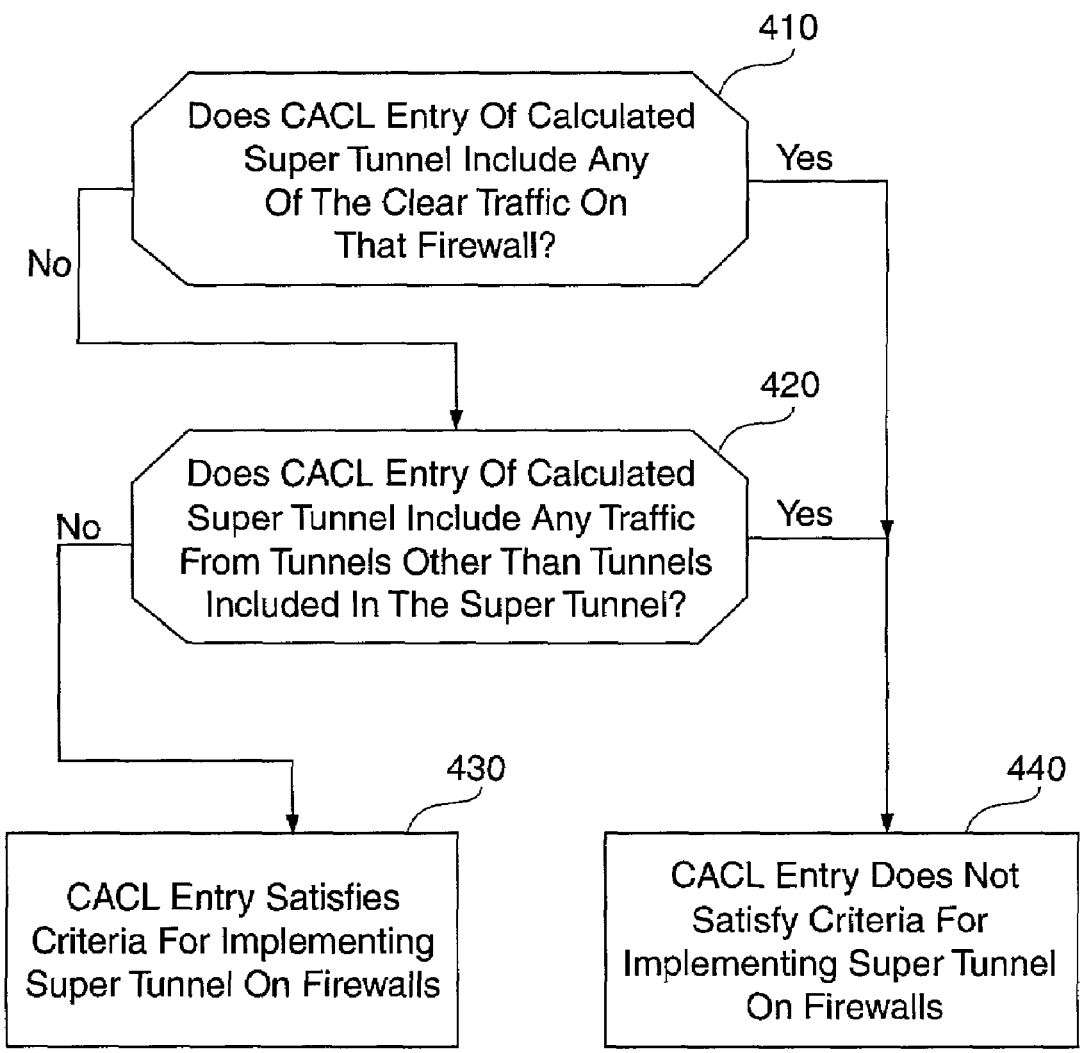
FIG. 4 illustrates a method for determining whether a super tunnel can be implemented on a network to replace existing tunnels.

In step 340, a determination is made as to whether the super tunnel would satisfy criteria for implementing the super tunnel on the particular firewall being inspected. FIG. 4 illustrates one embodiment for making the determination of step 340 in more detail. The determination requires that the super tunnel, when implemented, not interfere with (i) clear traffic across the selected firewall, and (ii) traffic on the selected firewall that is designated for tunnels other than those corresponding to entries of the selected CACL.

If the determination in step 340 is positive, step 345 provides that a peer to the selected CACL is identified. The peer CACL may be on another firewall. For example, the peer of one of the CACLs 132 (labeled as C1i) on first interface 110 may be one of the CACLs 182 on second interface 160.

In step 350, another determination is made as to whether the super tunnel satisfies a criteria for implementing the super tunnel on the firewall associated with the peer to the selected CACL. This step may be performed similar to step 340. The determination requires that the super tunnel, when implemented, not interfere with (i) clear traffic across the firewall of the peer to the selected CACL, and (ii) traffic on the firewall of the peer to the selected CACL that is designated for tunnels other than those corresponding to entries of the selected CACL.

If the determination in step 350 is positive, then step 355 provides that the super tunnel is implemented to exchange data packets between the firewalls associated with the super tunnel. Thus, the end nodes of the super tunnel include the selected CACL and the peer of that CACL Step 360 is performed if the determination in step 340 or step 350 is negative, or following step 355. In step 360, a determination is made as to whether another CACL exists in the selected firewall that has yet to be checked. If the determination is that another CACL exists in the crypto-map, then the method is performed again beginning with step 320.

If the determination in step 360 is negative, then step 370 makes a determination as to whether there is another firewall in the network that needs to be checked. If the determination is that another such firewall exists, then the method is performed again beginning with step 310. Otherwise, the method is done, meaning no other super tunnels can be implemented on the firewall to replace other CACL entries that configure the firewall.

Upon completion of a method as described by FIG. 3, the method may be implemented on other firewalls on the network.

FIG. 4 illustrates a method for determining whether a super tunnel can be implemented on a firewall to replace existing tunnels. The method may be implemented on a network such as shown by FIG. 1 in order to replace a set of tunnels that transport data packets between two firewalls. Reference to elements of FIG. 1 is intended to illustrate exemplary elements for an embodiment of the invention.

A method as described by FIG. 4 assumes that the super tunnel has been calculated. In one embodiment, a method as described by FIG. 4 may substitute for steps 340 or 350 in FIG. 3.

After the super tunnel is calculated, step 410 makes a determination as to whether the CACL entry that defines the super tunnel regulates any permitted data packets that are designated as being clear traffic on the selected firewall. This condition requires that the super tunnel does not take in or otherwise regulate any data packets that should be clear traffic in each of the firewalls that form the end nodes for that super tunnel.

On a given firewall, it can be assumed that $ik*oi$ defines traffic that is permitted to enter interface INTFk and leave inteface INTFi ($k!=i$), where Ik is the inlet ACL of INTFk, Oi is the outgoing filtering ACL of INTFi, and * is the intersect operator, which computes the intersection of two ACLs. All traffic permitted to enter from an interface other than INTFi and leave from INTFi is define by the following relationship:

$$\text{Traffic}(i) = I1*Oi + \ldots + I(i-1)*Oi + I(i+1)*Oi + \ldots + In*Oi$$

where $I(i-1)$ is the incoming filtering ACL of the $(i-1)$th interface, INTF$(i-1)$; n is the number of interfaces, and the symbol "+" is the union operator, which combines the permitted traffic of two ACLs. The tunneled traffic leaving INTFi is defined by the following relationship:

$$\text{Tunneled}(i) = \text{Traffic}(i) * (Ci1 + \ldots + Cim)$$

where m is the number of crypto-maps on interface INTFi. The clear traffic leaving INTFi is defined by the relationship:

$$\text{Clear}(i) = \text{Traffic}(i) - \text{Tunneled}(i)$$

Therefore, the determination in step 410 is whether any data packets that are subject to the super tunnel belong to the set of Clear(i) on that firewall.

If the determination of step 410 is that no clear traffic is being subjected to the super tunnel, step 420 makes a determination as to whether the CACL entry regulates any data packets that are designated to be part of a tunnel other than one of the tunnels being replaced by the super tunnel. Step 420 makes the determination as to whether data packets regulated by the CACL entry defining the super tunnel on that interface regulate data packets that would otherwise be serviced by other CACL entries that are not part of the super tunnel. In other words, the tunnel-traffic condition requires that the super tunnel does not take any traffic that should go in a tunnel with different properties.

According to embodiments of the invention, the CACLs of a given firewall may be structured to receive data packets in an order. Two or more CACLs in the given firewall may regulate the same data packets, but not be in conflict because one of the two CACLs is designated to receive and regulate data packets before the other CACL. Therefore, if both CACLs are to tunnel the same set of data packets, a data packet in that set would only be tunneled by the CACL encountered first in the firewall.

In one embodiment, the selection of tunnel traffic is a first-match process. The CACLs of a given firewall may be structured so that data packets encounter the CACLs indi- vidually, according to a particular order. For example, let the sequence of CACLs be Ci1, Ci2, . . . Cim. A permit data packet of the given firewall may be matched sequentially against Ci1, Ci2, . . . , and finally Cim. If there is a match at Cij, the packet goes into a tunnel defined by entries of that CACL. Therefore, if a super tunnel is implemented for entries of Cik, where k>j, then the super tunnel has no impact on the selection of packets for Cij. By the same token, Cij has impact only on Cjk where k>j. Therefore, the super tunnel of Cij needs only to not service traffic that goes in tunnels of Cik, where k>j.

Accordingly, in order to make the determination in step 420, the data packets serviced by the super tunnel must be compared to entries of CACLs following the entries selected for forming the super tunnel. CACL entries that precede the super tunnel in encountering data packets that may be serviced by the super tunnel need not be considered, since such data packets will not be received by the super tunnel.

If the determination in step 420 is positive, then step 430 determines that the single entry defining the super tunnel satisfies the criteria for implementing the super tunnel. The single entry is implemented to replace other selected entries that are meant to be replaced by the super tunnel.

If the determination in either step 410 or 420 is negative, then step 430 determines that the single entry defining the super tunnel does not satisfy the criteria for implementing the super tunnel on the selected CACL. In one embodiment such as shown by FIG. 3, another CACL on the firewall being inspected may be selected for tunnel broadening.

In another embodiment, another CACL entry may be defined for a super tunnel that is intended to replace a sub set of the previously selected CACL entries. For example, a super tunnel may be defined for half of the entries in one CACL. Once the super tunnel is determined, a method such as described with FIG. 4 may be performed again beginning with step 410 in order to determine whether the entry defining the new super tunnel is permissible on the firewall being inspected.

4.0 Implementation Architecture

Figure 5:
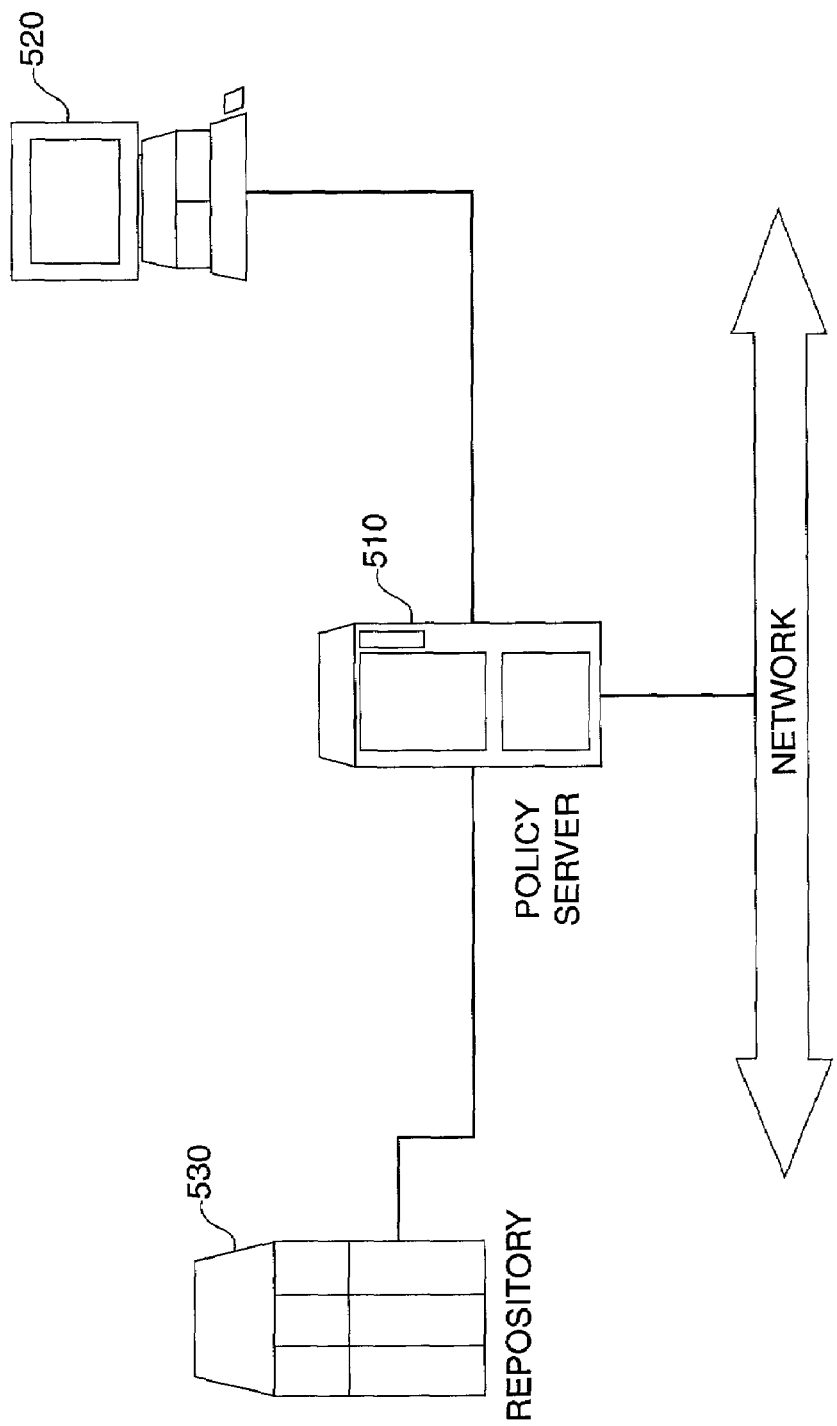
FIG. 5 illustrates components for implementing super tunnels on a network of security devices.

FIG. 5 illustrates components for implementing super tunnels on a network of security devices. The system includes a policy server 510 and a repository 530. The system also includes a terminal 520 to operate policy server 510. The policy server 510 may access a network 500 in order to configure a plurality of firewalls or other security devices residing on network 500.

Policy server 510 and repository 530 may be components of an overall network management system. One commercially available network management system is CISCO SECURE POLICY MANAGER (CSPM), manufactured by CISCO SYSTEMS.

The policy server 510 may access the repository 530 in order to access instructions that are to be executed when implementing a security policy. In an embodiment, policy server 510 executes instructions to inspect security devices on a network for purpose of tunnel reduction. The policy server 510 may execute instructions to determine a single CACL entry to replace a select set of CACL entries, each of which correspond to a tunnel node on the network. The policy server 510 may also execute instructions to determine whether a calculated super tunnel is permissible on both security devices forming end nodes for that super tunnel. If the permissible, the policy server 510 may configure those security devices to implement the super tunnel instead of the tunnels corresponding to the select set of CACL entries.

In addition, policy server 510 may execute instructions to determine whether a set of CACL entries are equivalent to the single CACL entry that defines the super tunnel. In one embodiment, policy server 510 executes instructions to determine whether the single CACL entry would alter the treatment of permit traffic passing through the interface of that security device if that single entry is implemented.

For each set of selected tunnels that may be replaced by the super tunnel, the policy server 510 identifies another security device interface configured by the peer to the CACL that contains the entries corresponding to the other end node of the selected set of tunnels. The policy server 510 makes the same determinations on both nodes of the selected set of tunnels to determine if the determined super tunnel is permissibly implanted between that pair of security device interfaces.

5.0 Hardware Overview

Figure 6:
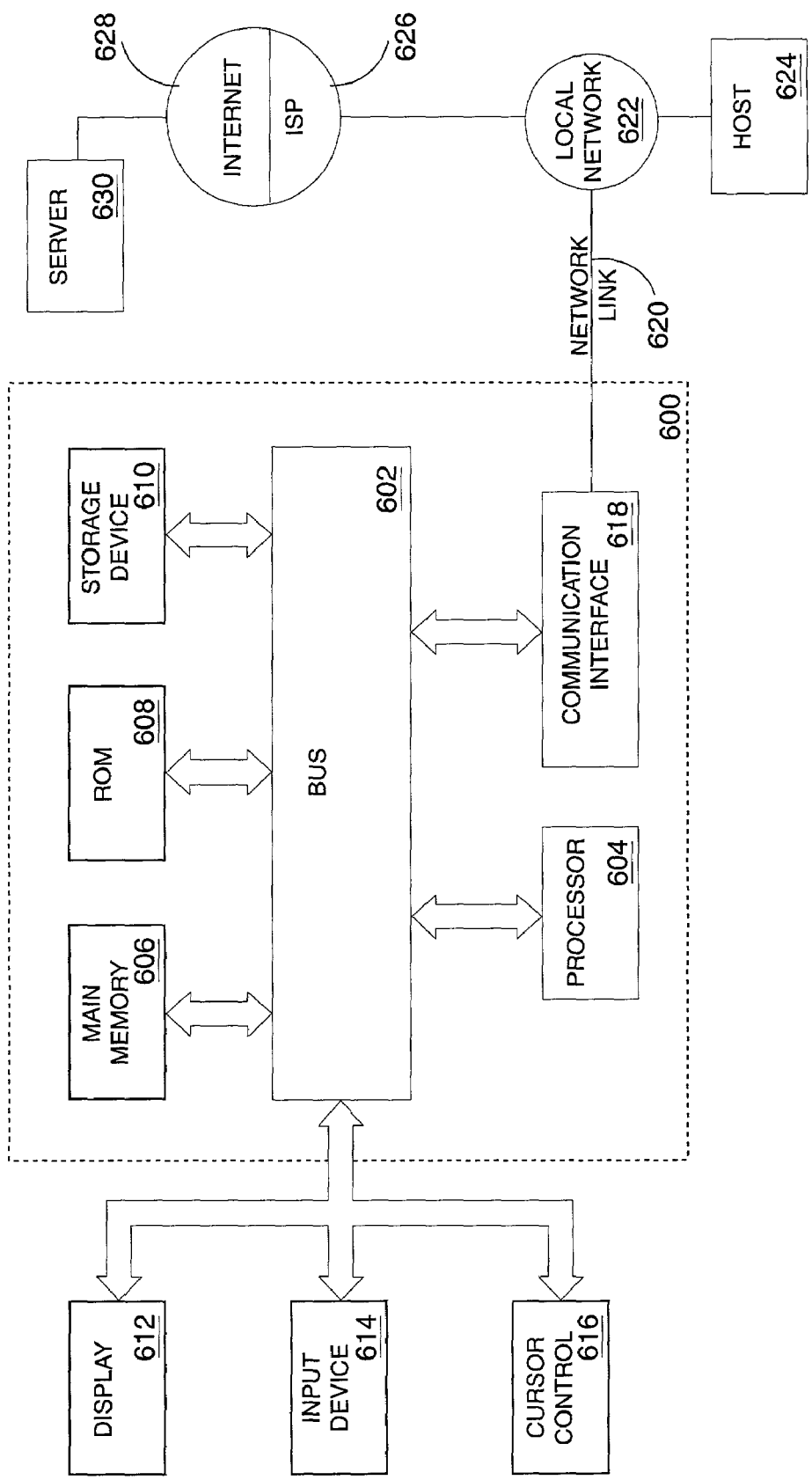
FIG. 6 is a block diagram that illustrates a computer system upon which an embodiment may be implemented.

FIG. 6 is a block diagram that illustrates a computer system 600 upon which an embodiment of the invention may be implemented. Computer system 600 includes a bus 602 or other communication mechanism for communicating information, and a processor 604 coupled with bus 602 for processing information. Computer system 600 also includes a main memory 606, such as a random access memory ("RAM") or other dynamic storage device, coupled to bus 602 for storing information and instructions to be executed by processor 604. Main memory 606 also may be used for storing temporary variables or other intermediate information during execution of instructions to be executed by processor 604. Computer system 600 further includes a read only memory ("ROM") 608 or other static storage device coupled to bus 602 for storing static information and instructions for processor 604. A storage device 610, such as a magnetic disk or optical disk, is provided and coupled to bus 602 for storing information and instructions.

Computer system 600 may be coupled via bus 602 to a display 612, such as a cathode ray tube ("CRT"), for displaying information to a computer user. An input device 614, including alphanumeric and other keys, is coupled to bus 602 for communicating information and command selections to processor 604. Another type of user input device is cursor control 616, such as a mouse, trackball, stylus, or cursor direction keys for communicating direction information and command selections to processor 604 and for controlling cursor movement on display 612. This input device typically has two degrees of freedom in two axes, a first axis (e.g., x) and a second axis (e.g., y), that allows the device to specify positions in a plane.

The invention is related to the use of computer system 600 for reducing the number of tunnels used to implement a security policy on a network. According to one embodiment of the invention, reducing the number of tunnels used to implement a security policy on a network is provided by computer system 600 in response to processor 604 executing one or more sequences of one or more instructions contained in main memory 606. Such instructions may be read into main memory 606 from another computer-readable medium, such as storage device 610. Execution of the sequences of instructions contained in main memory 606 causes processor 604 to perform the process steps described herein. In alternative embodiments, hard-wired circuitry may be used in place of or in combination with software instructions to implement the invention. Thus, embodiments of the invention are not limited to any specific combination of hardware circuitry and software.

The term "computer-readable medium" as used herein refers to any medium that participates in providing instructions to processor 604 for execution. Such a medium may take many forms, including but not limited to, non-volatile media, volatile media, and transmission media. Non-volatile media includes, for example, optical or magnetic disks, such as storage device 610. Volatile media includes dynamic memory, such as main memory 606. Transmission media includes coaxial cables, copper wire and fiber optics, including the wires that comprise bus 602. Transmission media can also take the form of acoustic or light waves, such as those generated during radio-wave and infra-red data communications.

Common forms of computer-readable media include, for example, a floppy disk, a flexible disk, hard disk, magnetic tape, or any other magnetic medium, a CD-ROM, any other optical medium, punchcards, papertape, any other physical medium with patterns of holes, a RAM, a PROM, and EPROM, a FLASH-EPROM, any other memory chip or cartridge, a carrier wave as described hereinafter, or any other medium from which a computer can read.

Various forms of computer readable media may be involved in carrying one or more sequences of one or more instructions to processor 604 for execution. For example, the instructions may initially be carried on a magnetic disk of a remote computer. The remote computer can load the instructions into its dynamic memory and send the instructions over a telephone line using a modem. A modem local to computer system 600 can receive the data on the telephone line and use an infra-red transmitter to convert the data to an infra-red signal. An infra-red detector can receive the data carried in the infra-red signal and appropriate circuitry can place the data on bus 602. Bus 602 carries the data to main memory 606, from which processor 604 retrieves and executes the instructions. The instructions received by main memory 606 may optionally be stored on storage device 610 either before or after execution by processor 604.

Computer system 600 also includes a communication interface 618 coupled to bus 602. Communication interface 618 provides a two-way data communication coupling to a network link 620 that is connected to a local network 622. For example, communication interface 618 may be an integrated services digital network ("ISDN") card or a modem to provide a data communication connection to a corresponding type of telephone line. As another example, communication interface 618 may be a local area network ("LAN") card to provide a data communication connection to a compatible LAN. Wireless links may also be implemented. In any such implementation, communication interface 618 sends and receives electrical, electromagnetic or optical signals that carry digital data streams representing various types of information.

Network link 620 typically provides data communication through one or more networks to other data devices. For example, network link 620 may provide a connection through local network 622 to a host computer 624 or to data equipment operated by an Internet Service Provider ("ISP") 626. ISP 626 in turn provides data communication services through the world wide packet data communication network now commonly referred to as the "Internet" 628. Local network 622 and Internet 628 both use electrical, electromagnetic or optical signals that carry digital data streams. The signals through the various networks and the signals on network link 620 and through communication interface 618, which carry the digital data to and from computer system 600, are exemplary forms of carrier waves transporting the information.

Computer system 600 can send messages and receive data, including program code, through the network(s), network link 620 and communication interface 618. In the Internet example, a server 630 might transmit a requested code for an application program through Internet 628, ISP 626, local network 622 and communication interface 618. In accordance with the invention, one such downloaded application provides for reducing the number of tunnels used to implement a security policy on a network, as described herein.

The received code may be executed by processor 604 as it is received, and/or stored in storage device 610, or other non-volatile storage for later execution. In this manner, computer system 600 may obtain application code in the form of a carrier wave.

6.0 Extensions and Alternatives

While an embodiment described with FIG. 3 describes selecting a super tunnel for all entries of a selected CACL, other embodiments may select portions of a given CACL for implementation of a super tunnel. For example, subsets of entries in a CACL may be selected for implementation of a super tunnel, as opposed to selection of all entries in the particular CACL.

In the foregoing specification, the invention has been described with reference to specific embodiments thereof. It will, however, be evident that various modifications and changes may be made thereto without departing from the broader spirit and scope of the invention. The specification and drawings are, accordingly, to be regarded in an illustrative rather than a restrictive sense.

What is claimed is:

1. A method for reducing a number of tunnels used to implement a security policy on a network, the method comprising:
   selecting a set of tunnels for exchanging data packets between a first security device and a second security device; each tunnel in the set of tunnels specifying a dimensional range for data packets that are subject to that tunnel;
   determining a super tunnel for the set of tunnels, so that a dimensional range of the data packets that would be made subject to the super tunnel encompasses a dimensional range of the data packets that are subject to the set of tunnels;
   determining that the super tunnel would, if implemented, tunnel data packets that are subject only to tunnels in the set of tunnels; and
   in response to determining that the super tunnel would, if implemented, tunnel data packets that are subject only to tunnels in the set of tunnels, implementing the super tunnel between the first security device and the second security device;
   wherein implementing the super tunnel reduces the number of tunnels used to implement the security policy on the network.

2. The method of claim 1, wherein:
   selecting a set of tunnels for exchanging data packets between a first security device and a second security device includes selecting a set of entries in an access control list associated with one of the first security device or the second security device, each entry at least partially defining one of the tunnels in the set of tunnels; and
   determining a super tunnel for the set of tunnels includes determining a single entry in the access control list that may replace the set of entries.

3. The method of claim 1, wherein:
   selecting a set of tunnels for exchanging data packets between a first security device and a second security device includes selecting a set of entries in a crypto-access control list associated with one of the first security device or the second security device, each entry at least partially defining one of the tunnels in the set of tunnels; and
   determining a super tunnel for the set of tunnels includes determining a single entry in the crypto-access control list that may replace the set of entries.

4. The method of claim 1, wherein determining a super tunnel for the set of tunnels includes determining a single entry in a crypto-access control list to replace a plurality of entries in the crypto-access control list corresponding to the set of tunnels, so that a first set of dimensional ranges specified by the single entry would encompass the data packets that were made subject to the set of tunnels.

5. The method of claim 1, wherein:
   determining a super tunnel for the set of tunnels includes determining a single entry in a crypto-access control list to replace a plurality of entries in the crypto-access control list corresponding to the set of tunnels, at least one of the source address range, the destination address range, and the service range specified by the single entry would encompass the data packets that are subject to the set of tunnels.

6. The method of claim 1, wherein determining that the super tunnel would, if implemented, tunnel data packets that are otherwise subject only to tunnels in the set of tunnels includes determining that data packets, permitted on at least one of the first security device and the second security device and designated for a tunnel other than one of the tunnels in the set of tunnels, would not made subject to the super tunnel if the super tunnel is implemented.

7. The method of claim 1, wherein determining that the super tunnel would, if implemented, tunnel data packets that are otherwise subject only to tunnels in the set of tunnels includes determining whether data packets that are designated as clear traffic on least one of the first security device and the second security device, would not be subject to the super tunnel.

8. The method of claim 1, wherein:
   selecting a set of tunnels includes selecting a first set of entries in a crypto-access control list on the first security device, each of the first set of entries forming one end for one of the tunnels in the set of tunnels;
   determining that the super tunnel would, if implemented, tunnel data packets that are otherwise subject only to tunnels in the set of tunnels includes:
      identifying a peer to the crypto-access control list, the peer containing a second set of entries, each of the second set of entries forming another end for one of the tunnels in the set of tunnels; and
      determining that data packets permitted by both the first security device and the second security device and designated for a tunnel other than one of the tunnels in the set of tunnels are not made subject to the super tunnel.

9. The method of claim 1, further comprising:
   selecting a set of tunnels includes selecting a first set of entries in a crypto-access control list on the first security device, each of the first set of entries forming one end for one of the tunnels in the set of tunnels;
   determining that the super tunnel would, if implemented, tunnel data packets that are otherwise subject only to tunnels in the set of tunnels includes:
      identifying a peer to the crypto-access control list, the peer containing a second set of entries, each of the second set of entries forming another end for one of the tunnels in the set of tunnels;

determining that data packets designated by both the first security device and the second security device as clear traffic are not made subject to the super tunnel.

10. A method for reducing the number of tunnels used to implement a security policy on a network, the method comprising:

identifying a super tunnel for servicing all of the data packets that are permissible by a plurality of select entries in a crypto-access control list of a first security device;

determining whether the super tunnel can be implemented on the first security device without affecting data packets that are to pass through the first security device as clear traffic;

determining whether the super tunnel can be implemented on the first security device without affecting data packets that are to pass through the first security device and be controlled by entries other than the plurality of select entries;

in response to determining that the super tunnel can be implemented on the first security device without affecting data packets that are to pass through the first security device as clear traffic, and without affecting data packets that are to pass through the first security device and be serviced using entries other than the plurality of select entries, identifying on a second security device a corresponding plurality of select entries in a peer to the crypto-access control list on the first security device;

determining whether the super tunnel can be implemented on the second security device without affecting data packets that are to pass through the second security device as clear traffic;

determining whether the super tunnel can be implemented on the second security device without affecting data packets that are to pass through the second security device and be serviced using entries other than the corresponding plurality of select entries of the peer to the crypto-access control; and in response to determining that the super tunnel can be implemented on the first security device and on the second security device, implementing the tunnel to service select data packets that are permitted on the first security device and on the second security device.

11. The method as recited in claim 10, further comprising determining a tunnel for controlling all of the data packets that are permissible by each entry in the crypto-access control list of the first security device.

12. The method of claim 10, further comprising determining whether the super tunnel can be implemented on the first security device without affecting data packets that are to pass through the first security device and be serviced by entries in another crypto-access control list of the first security device.

13. A computer system configured to reduce a number of tunnels used to implement a security policy on a network, the computer system comprising:

one or more storage mediums to store a first crypto-access control list associated with a first security device, and a second crypto-access control associated with a second security device, the second crypto-access control list being associated in the storage medium as a peer for the first crypto-access control list;

a processor programmed to:

identify a plurality of select entries in the first crypto-access control list that service a first plurality of data packets;

determine a single entry to service the first plurality of data packets instead of the plurality of select entries;

determine that the single entry does not service data packets permitted by the first security device other than data packets in the first plurality of data packets;

identify a corresponding plurality of select entries of the second crypto-access control list on the second security device that service a second plurality of data packets;

determine that the single entry does not service data packets permitted by the second security device other than data packets in the second plurality of data packets; and configure the first crypto-access control list and the second crypto-access control list to implement the single entry to service the first plurality of data packets and the second plurality of data packets.

14. A computer system as recited in claim 13, wherein the processor is configured to determine that the single entry does not service data packets permitted by the first security device other than data packets in the first plurality of data packets by (i) determining that data packets designated to be passed through the first security device as clear traffic are not affected by the single entry, and (ii) determining that data packets designated to be controlled by entries other than the plurality of select entries in the first crypto-access control list are not affected by the single entry.

15. A computer system as recited in claim 13, wherein the processor is configured to determine that the single entry does not service data packets permitted by the second security device other than data packets in the second plurality of data packets by (i) determining that data packets designated to be passed through the second security device as clear traffic are not affected by the single entry, and (ii) determining that data packets designated to be controlled by entries other than entries in the corresponding plurality of select entries in the second crypto-access control list are not affected by the single entry.

16. A computer-readable storage medium for reducing a number of tunnels used to implement a security policy on a network, the computer-readable medium carrying instructions for performing the steps of:

selecting a set of tunnels for exchanging data packets between a first security device and a second security device, each tunnel in the set of tunnels specifying a dimensional range for data packets that are subject to that tunnel;

determining a super tunnel for the set of tunnels, so that a dimensional range of the data packets that would be made subject to the super tunnel encompasses a dimensional range of the data packets that are subject to the set of tunnels;

determining that the super tunnel would, if implemented, tunnel data packets that are otherwise subject only to tunnels in the set of tunnels; and in response to determining that the super tunnel would, if implemented, tunnel data packets that are otherwise subject only to tunnels in the set of tunnels, implementing the super tunnel between the first security device and the second security device;

wherein implementing the super tunnel reduces the number of tunnels used to implement the security policy on the network.

17. An apparatus for reducing a number of tunnels used to implement a security policy on a network, the apparatus comprising:

means for selecting a set of tunnels for exchanging data packets between a first security device and a second security device, each tunnel in the set of tunnels specifying a dimensional range for data packets that are subject to that tunnel;

means for determining a super tunnel to replace the set of tunnels, so that a dimensional range of the data packets that would be made subject to the super tunnel encompasses a dimensional range of the data packets that are subject to the set of tunnels;

means for determining that the super tunnel would, if implemented, tunnel data packets that are otherwise subject only to tunnels in the set of tunnels; and means for implementing the super tunnel between the first security device and the second security device in response to determining that the super tunnel would, if implemented, tunnel data packets that are otherwise subject only to tunnels in the set of tunnels;

wherein implementing the super tunnel reduces the number of tunnels used to implement the security policy on the network.

18. The apparatus of claim 17, wherein:

the means for selecting a set of tunnels for exchanging data packets between a first security device and a second security device include means for selecting a set of entries in an access control list associated with one of the first security device or the second security device, each entry at least partially defining one of the tunnels in the set of tunnels; and the means for determining a super tunnel for the set of tunnels include means for determining a single entry in the access control list that may replace the set of entries.

19. The apparatus of claim 17, wherein:

the means for selecting a set of tunnels for exchanging data packets between a first security device and a second security device include means for selecting a set of entries in a crypto-access control list associated with one of the first security device or the second security device, each entry at least partially defining one of the tunnels in the set of tunnels; and the means for determining a super tunnel for the set of tunnels include means for determining a single entry in the crypto-access control list that may replace the set of entries.

20. The apparatus of claim 17, wherein the means for determining a super tunnel for the set of tunnels include means for determining a single entry in a crypto-access control list to replace a plurality of entries in the crypto-access control list corresponding to the set of tunnels, so that a first set of dimensional ranges specified by the single entry would encompass the data packets that were made subject to the set of tunnels.

21. The apparatus of claim 17, wherein the means for determining that the super tunnel would, if implemented, tunnel data packets that are otherwise subject only to tunnels in the set of tunnels include means for determining that data packets, permitted on at least one of the first security device and the second security device and designated for a tunnel other than one of the tunnels in the set of tunnels, would not made subject to the super tunnel if the super tunnel is implemented.

22. The apparatus of claim 17, wherein the means for determining that the super tunnel would, if implemented, tunnel data packets that are otherwise subject only to tunnels in the set of tunnels include means for determining whether data packets that are designated as clear traffic on least one of the first security device and the second security device would not be subject to the super tunnel.

23. The apparatus of claim 17, wherein:

the means for selecting a set of tunnels includes means for selecting a first set of entries in a crypto-access control list on the first security device, each of the first set of entries forming one end for one of the tunnels in the set of tunnels;

the means for determining that the super tunnel would, if implemented, tunnel data packets that are otherwise subject only to tunnels in the set of tunnels include:

means for identifying a peer to the crypto-access control list, the peer containing a second set of entries, each of the second set of entries forming another end for one of the tunnels in the set of tunnels; and means for determining that data packets permitted by both the first security device and the second security device and designated for a tunnel other than one of the tunnels in the set of tunnels are not made subject to the super tunnel.

24. The apparatus of claim 17, wherein:

the means for selecting a set of tunnels include means for selecting a first set of entries in a crypto-access control list on the first security device, each of the first set of entries forming one end for one of the tunnels in the set of tunnels;

the means for determining that the super tunnel would, if implemented, tunnel data packets that are otherwise subject only to tunnels in the set of tunnels include:

means for identifying a peer to the crypto-access control list, the peer containing a second set of entries, each of the second set of entries forming another end for one of the tunnels in the set of tunnels; and means for determining that data packets designated by both the first security device and the second security device as clear traffic are not made subject to the super tunnel.

25. An apparatus for reducing a number of tunnels used to implement a security policy on a network, the apparatus comprising:

one or more processors; and a computer-readable storage medium coupled to one or more of the processors and comprising one or more stored sequences of instructions which, when executed by one or more of the processors, cause one or more of the processors to perform steps comprising:

selecting a set of tunnels for exchanging data packets between a first security device and a second security device, each tunnel in the set of tunnels specifying a dimensional range for data packets that are subject to that tunnel;

determining a super tunnel for the set of tunnels, so that a dimensional range of the data packets that would be made subject to the super tunnel encompasses a dimensional range of the data packets that are subject to the set of tunnels;

determining that the super tunnel would, if implemented, tunnel data packets that are subject only to tunnels in the set of tunnels; and in response to determining that the super tunnel would, if implemented, tunnel data packets that are subject only to tunnels in the set of tunnels, implementing the super tunnel between the first security device and the second security device;
  wherein implementing the super tunnel reduces the number of tunnels used to implement the security policy on the network.

26. The apparatus of claim 25, wherein:
  selecting a set of tunnels for exchanging data packets between a first security device and a second security device includes selecting a set of entries in an access control list associated with one of the first security device or the second security device, each entry at least partially defining one of the tunnels in the set of tunnels; and
  determining a super tunnel for the set of tunnels includes determining a single entry in the access control list that may replace the set of entries.

27. The apparatus of claim 25, wherein:
  selecting a set of tunnels for exchanging data packets between a first security device and a second security device includes selecting a set of entries in a crypto-access control list associated with one of the first security device or the second security device, each entry at least partially defining one of the tunnels in the set of tunnels; and
  determining a super tunnel for the set of tunnels includes determining a single entry in the crypto-access control list that may replace the set of entries.

28. The apparatus of claim 25, wherein determining a super tunnel for the set of tunnels includes determining a single entry in a crypto-access control list to replace a plurality of entries in the crypto-access control list corresponding to the set of tunnels, so that a first set of dimensional ranges specified by the single entry would encompass the data packets that were made subject to the set of tunnels.

29. The apparatus of claim 25, wherein determining that the super tunnel would, if implemented, tunnel data packets that are otherwise subject only to tunnels in the set of tunnels includes determining that data packets, permitted on at least one of the first security device and the second security device and designated for a tunnel other than one of the tunnels in the set of tunnels, would not made subject to the super tunnel if the super tunnel is implemented.

30. The apparatus of claim 25, wherein determining that the super tunnel would, if implemented, tunnel data packets that are otherwise subject only to tunnels in the set of tunnels includes determining whether data packets that are designated as clear traffic on least one of the first security device and the second security device would not be subject to the super tunnel.

31. The apparatus of claim 25, wherein:
  selecting a set of tunnels includes selecting a first set of entries in a crypto-access control list on the first security device, each of the first set of entries forming one end for one of the tunnels in the set of tunnels;
  determining that the super tunnel would, if implemented, tunnel data packets that are otherwise subject only to tunnels in the set of tunnels includes:
    identifying a peer to the crypto-access control list, the peer containing a second set of entries, each of the second set of entries forming another end for one of the tunnels in the set of tunnels; and
    determining that data packets permitted by both the first security device and the second security device and designated for a tunnel other than one of the tunnels in the set of tunnels are not made subject to the super tunnel.

32. The apparatus of claim 25, wherein:
  selecting a set of tunnels includes selecting a first set of entries in a crypto-access control list on the first security device, each of the first set of entries forming one end for one of the tunnels in the set of tunnels;
  determining that the super tunnel would, if implemented, tunnel data packets that are otherwise subject only to tunnels in the set of tunnels includes:
    identifying a peer to the crypto-access control list, the peer containing a second set of entries, each of the second set of entries forming another end for one of the tunnels in the set of tunnels;
    determining that data packets designated by both the first security device and the second security device as clear traffic are not made subject to the super tunnel.

33. An apparatus for reducing a number of tunnels used to implement a security policy on a network, the apparatus comprising:
  one or more processors; and
  a computer-readable storage medium coupled to one or more of the processors and comprising one or more stored sequences of instructions which, when executed by one or more of the processors, cause one or more of the processors to perform steps comprising:
    selecting a set of tunnels for exchanging data packets between a first security device and a second security device, each tunnel in the set of tunnels specifying a dimensional range for data packets that are subject to that tunnel;
    determining a super tunnel for the set of tunnels, so that a dimensional range of the data packets that would be made subject to the super tunnel encompasses a dimensional range of the data packets that are subject to the set of tunnels, wherein determining the super tunnel for the set of tunnels includes determining a single entry in a crypto-access control list to replace a plurality of entries in the crypto-access control list corresponding to the set of tunnels, so that a first set of dimensional ranges specified by the single entry would encompass the data packets that were made subject to the set of tunnels;
    determining that the super tunnel would, if implemented, tunnel data packets that are subject only to tunnels in the set of tunnels; and
    in response to determining that the super tunnel would, if implemented, tunnel data packets that are subject only to tunnels in the set of tunnels, implementing the super tunnel between the first security device and the second security device.

34. An apparatus for reducing a number of tunnels used to implement a security policy on a network, the apparatus comprising:
  one or more processors; and
  a computer-readable storage medium coupled to one or more of the processors and comprising one or more stored sequences of instructions which, when executed by one or more of the processors, cause one or more of the processors to perform steps comprising:
    selecting a set of tunnels for exchanging data packets between a first security device and a second security device, each tunnel in the set of tunnels specifying a dimensional range for data packets that are subject to that tunnel, wherein selecting the set of tunnels for exchanging data packets between the first security device and the second security device includes selecting a set of entries in an list associated with one of the first security device and the second security device, each entry at least partially defining one of the tunnels in the set of tunnels;

determining a super tunnel for the set of tunnels, so that a dimensional range of the data packets that would be made subject to the super tunnel encompasses a dimensional range of the data packets that are subject to the set of tunnels, wherein determining the super tunnel for the set of tunnels includes determining a single entry in the list that may replace the set of entries;

determining that the super tunnel would, if implemented, tunnel data packets that are subject only to tunnels in the set of tunnels; and in response to determining that the super tunnel would, if implemented, tunnel data packets that are subject only to tunnels in the set of tunnels, implementing the super tunnel between the first security device and the second security device;

wherein the list is one of an access control list and a crypto-access control list.

* * * * *

UNITED STATES PATENT AND TRADEMARK OFFICE
CERTIFICATE OF CORRECTION

PATENT NO. : 7,107,613 B1
APPLICATION NO. : 10/109387
DATED : September 12, 2006
INVENTOR(S) : Shigang Chen et al.

It is certified that error appears in the above-identified patent and that said Letters Patent is hereby corrected as shown below:

| | |
|---|---|
| Col. 16, line 29 | After "not" insert --be-- |
| Col. 16, line 35 | After "on" insert --at-- |
| Col. 19, line 66 | Before "made" insert --be-- |
| Col. 20, line 5 | After "on" insert --at-- |
| Col. 21, line 41 | After "not" insert --be-- |
| Col. 21, line 46 | After "on" insert --at-- |
| Col. 23, line 1 | Delete "an" and insert --a-- |

Signed and Sealed this

Fifth Day of December, 2006

JON W. DUDAS
*Director of the United States Patent and Trademark Office*